US010800219B2

(12) United States Patent
Harper

(10) Patent No.: US 10,800,219 B2
(45) Date of Patent: Oct. 13, 2020

(54) ADJUSTABLE TRAILER HITCH BALL MOUNT WITH INTEGRAL LOCK

(71) Applicant: Progress Mfg. Inc., Provo, UT (US)

(72) Inventor: Jason Robert Harper, Springville, UT (US)

(73) Assignee: PROGRESS MFG. INC., Provo, UT (US)

(*) Notice: Subject to any disclaimer, the term of this patent is extended or adjusted under 35 U.S.C. 154(b) by 263 days.

(21) Appl. No.: 15/725,113

(22) Filed: Oct. 4, 2017

(65) Prior Publication Data
US 2018/0281536 A1 Oct. 4, 2018

Related U.S. Application Data

(63) Continuation of application No. 15/216,648, filed on Jul. 21, 2016, now abandoned.

(51) Int. Cl.
B60D 1/60 (2006.01)
B60D 1/52 (2006.01)
B60D 1/06 (2006.01)
B60D 1/46 (2006.01)
B60D 1/48 (2006.01)

(52) U.S. Cl.
CPC .............. B60D 1/60 (2013.01); B60D 1/06 (2013.01); B60D 1/52 (2013.01); B60D 1/46 (2013.01); B60D 1/485 (2013.01)

(58) Field of Classification Search
CPC ... B60D 1/06; B60D 1/28; B60D 1/44; B60D 1/46; B60D 1/48; B60D 1/485; B60D 1/52; B60D 1/60; Y10T 292/096; Y10T 292/1014; Y10T 292/1022; Y10T 292/1016; Y10T 292/0961; Y10T 292/0968; Y10T 292/0834; Y10T 292/084
USPC ................... 280/504, 507; 70/14, 31, 32, 34
See application file for complete search history.

(56) References Cited

U.S. PATENT DOCUMENTS

| | | | | |
|---|---|---|---|---|
| 5,491,992 A * | 2/1996 | Mandall | ................... | B60D 1/60 70/14 |
| 5,730,456 A * | 3/1998 | Bowers | ................... | B60D 1/52 280/491.5 |
| 6,598,897 B1 * | 7/2003 | Patti | ................... | B60D 1/06 280/478.1 |
| 7,066,483 B2 | 6/2006 | Makos et al. | | |
| 2004/0240934 A1 * | 12/2004 | Makos | ................... | B60D 1/485 403/322.3 |
| 2005/0225054 A1 | 10/2005 | Budge | | |
| 2010/0283225 A1 * | 11/2010 | Lahn | ................... | B60D 1/06 280/506 |

* cited by examiner

Primary Examiner — Jacob D Knutson
Assistant Examiner — Maurice L Williams
(74) Attorney, Agent, or Firm — Morriss O'Bryant Compagni Cannon, PLLC

(57) ABSTRACT

A trailer hitch ball mount with an integral lock mechanism is disclosed, which may include a shank having a longitudinal bore and a transverse bore. A lock shaft may be disposed in the longitudinal bore and a first and second slide pin may be disposed in the transverse bore. The first slide pin include a contact portion facing toward the lock shaft. The contact portion of the first slide pin may include a flat surface.

29 Claims, 15 Drawing Sheets

ADJUSTABLE TRAILER HITCH BALL MOUNT WITH INTEGRAL LOCK

CROSS-REFERENCE TO RELATED APPLICATIONS

This application is a continuation of U.S. patent application Ser. No. 15/216,648, filed Jul. 21, 2016, which is hereby incorporated by reference herein in its entirety, including but not limited to those portions that specifically appear hereinafter, the incorporation by reference being made with the following exception: In the event that any portions of the above-referenced application is inconsistent with this application, this application supercedes the above-referenced application.

STATEMENT REGARDING FEDERALLY SPONSORED RESEARCH OR DEVELOPMENT

Not Applicable.

BACKGROUND

1. The Field of the Present Disclosure

The present disclosure relates generally to trailer hitches, and more particularly, but not necessarily entirely, to integral locks for hitch-mounted devices such as an adjustable trailer hitch ball mount.

2. Description of Related Art

Trailer hitches are utilized to couple tow vehicles and trailers. In a standard configuration, a trailer hitch may comprise a receiver permanently mounted to the undercarriage of the tow vehicle. A ball mount may include a shank portion configured and adapted to be installed in the receiver. The shank may include a locking pin bore corresponding to locking pin apertures in the receiver, through which a looking pin may be inserted to secure the ball mount to the receiver.

The ball mount may further include a bore for a shaft of a hitch ball. Conventional ball mounts may include a fixed drop portion for providing a height difference between the receiver and the hitch ball. It will be appreciated that the height difference between the hitch ball and the receiver, referred to as a drop, may be necessary for safe towing as the trailer should always be as level as possible. Accordingly, ball mounts have been constructed with a variable drop. In particular, the hitches may include a drop bar having a plurality of discrete mounting locations for a ball support member.

It will also be appreciated that securing the ball mount to the receiver is necessary for safe towing. Further, it may be desirable to lock the ball mount to the receiver to prevent theft or other unwanted removal of the ball mount from the receiver. Despite the advantages of the known trailer hitches, improvements are still being sought. The prior art is characterized by several disadvantages that may be addressed by the present disclosure. The present disclosure minimizes, and in some aspects eliminates, the failures of the prior art, by utilizing the system and components described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
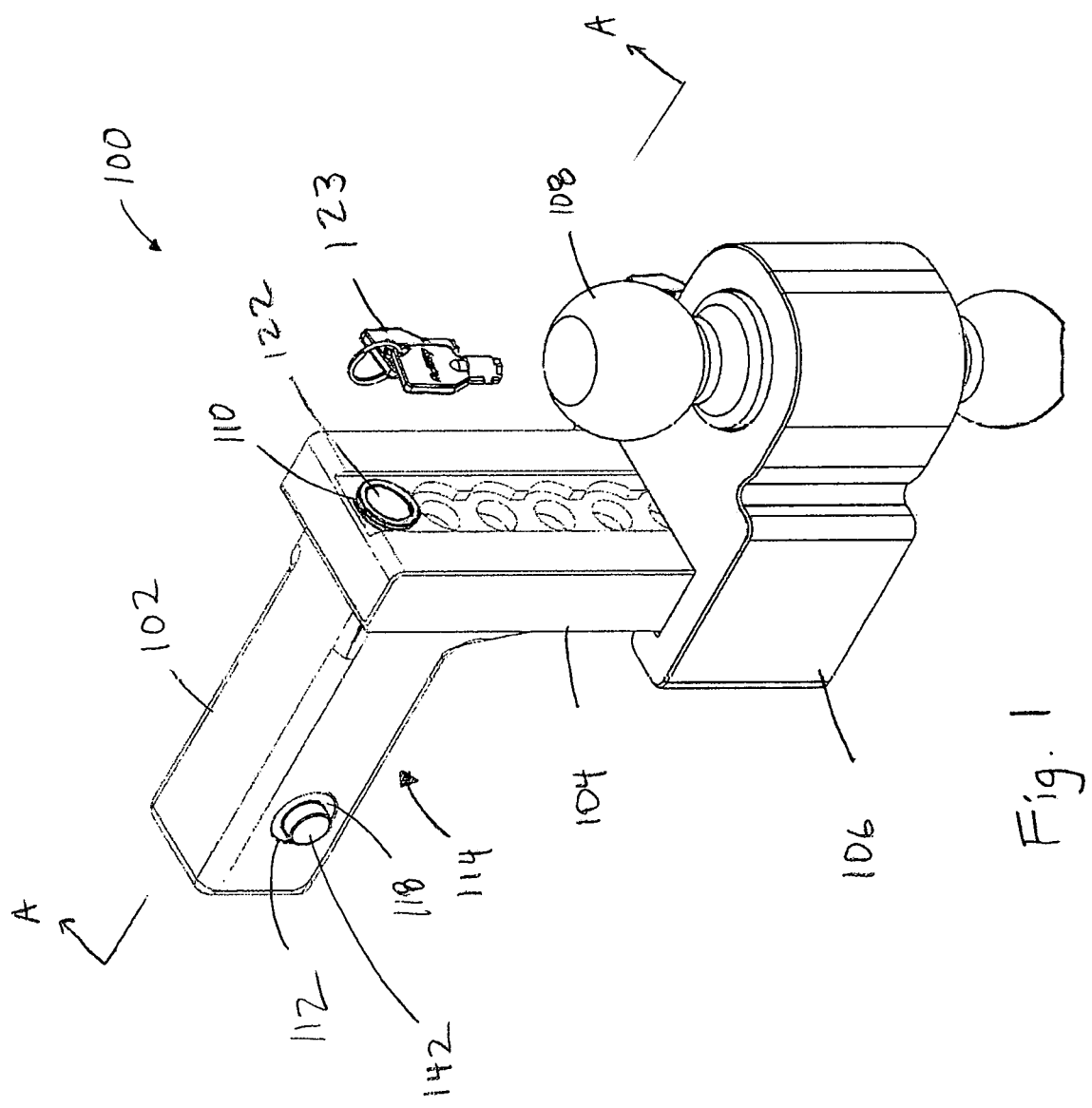
FIG. 1 is a perspective view of an example of a trailer hitch ball mount according to the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Applicant has discovered the need for an improved trailer hitch-mounted device with integral lock. Known trailer hitch-mounted devices, including trailer hitch ball mounts with integral locks for locking a trailer hitch ball mount to a hitch receiver, have been found by Applicant to have various disadvantageous that may cause the integral lock mechanism to fail, preventing further locking or unlocking of the ball mount to or from the hitch receiver. For example, the lock mechanisms of previously available devices may bind due to the movement and/or interactions between the components of the lock mechanism. When a lock mechanism becomes bound, the device fails and no longer functions.

Applicant has invented a trailer hitch-mounted apparatus with an integral lock that may decrease or completely eliminate the failures experienced with known trailer hitch-mounted devices including an integral lock mechanism. The trailer hitch-mounted device, such as a trailer hitch ball mount, may have an integral lock comprising components configured, dimensioned and adapted to lock and unlock without the risk of binding. For example, the integral lock may include a pair of slide pins that cooperate with a rotating lock shaft through a cam and follower mechanism. When the a key is inserted into a lock cylinder disposed in communication with the lock shaft and the key is turned, causing the lock shaft to rotate, the cam and follower mechanisms cause the slide pins to be displaced in a transverse direction. In one example, one of the slide pins may include a notch or a substantially flat surface on a portion of the slide pin that contacts, abuts, or is disposed near the lock shaft. The notch or substantially flat surface may prevent binding of the lock mechanism by, for example, preventing the slide pins from rotating.

In an example of Applicant's trailer hitch ball mount, the pair of slide pins may move in opposite directions when the lock shaft rotates. For example, the first and second slide pins may both be displaced inwardly, the first pin moving to the left and the second pin moving to the right, to reach an unlocked position. Conversely, the first and second slide pins may be displaced outwardly, the first pin moving to the right and the second pin moving to the left, to reach a locked position. In a locked position, the pins, or a protrusion such as a cylindrical protrusion disposed on the end of the pins, may engage or be received in locking apertures in a hitch receiver of a tow vehicle, thereby securing the hitch ball mount to the hitch receiver.

Figure 2:
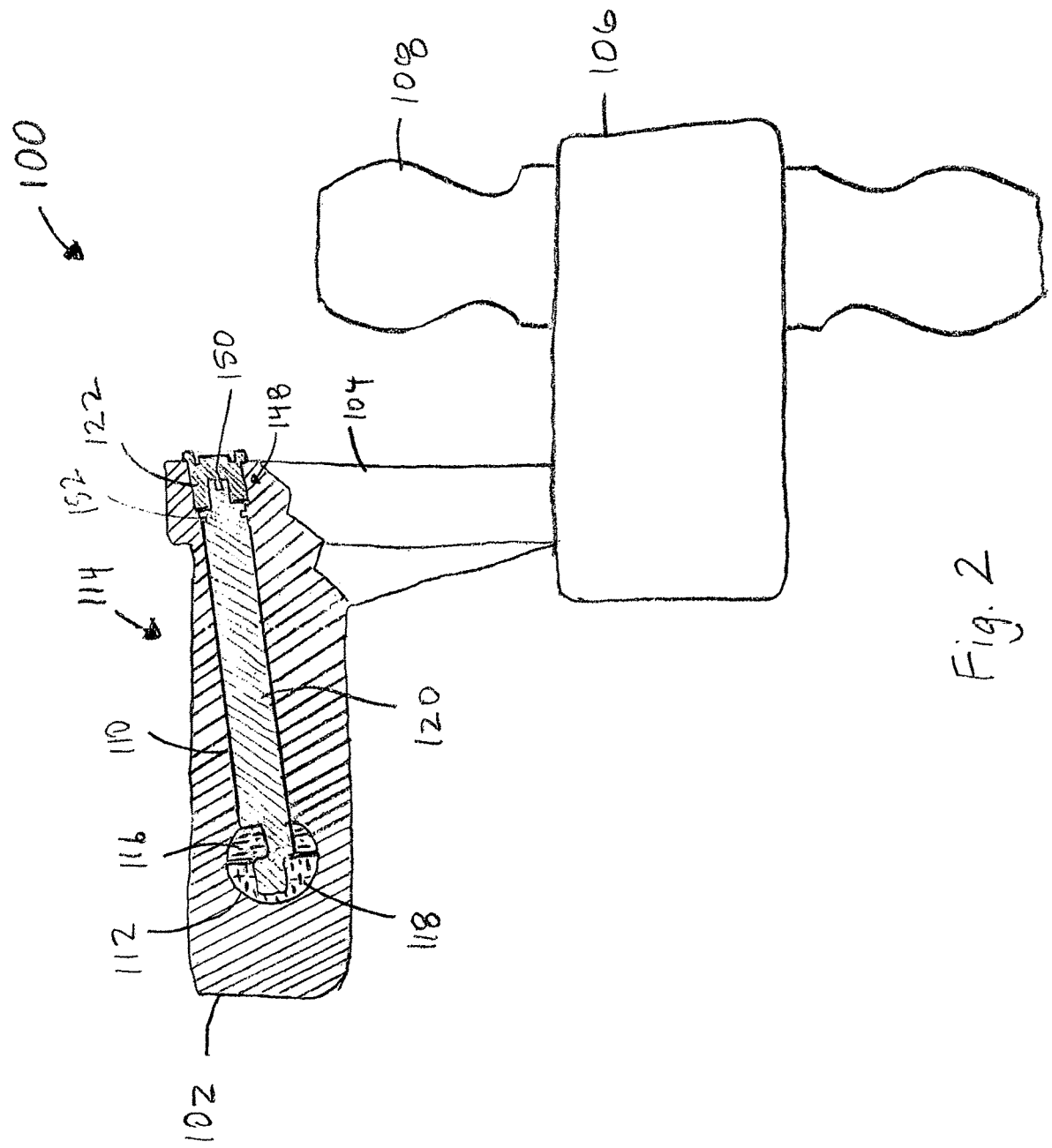
FIG. 2 is a side, partial cross-sectional view of the trailer hitch ball mount of FIG. 1 taken along section A-A.
Figure 3:
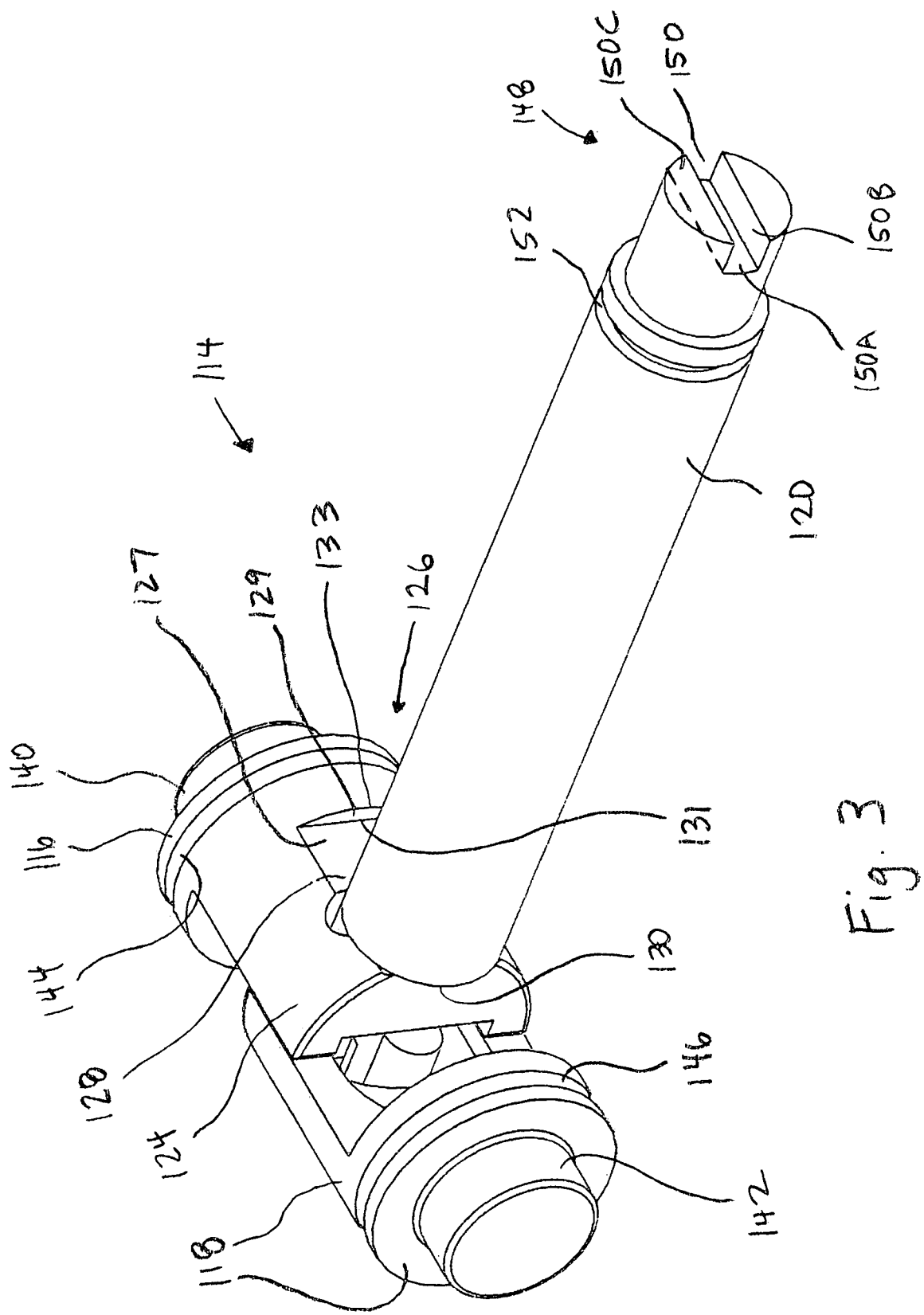
FIG. 3 is a left isometric view of an example lock mechanism of the trailer hitch ball mount of FIG. 1.
Figure 4:
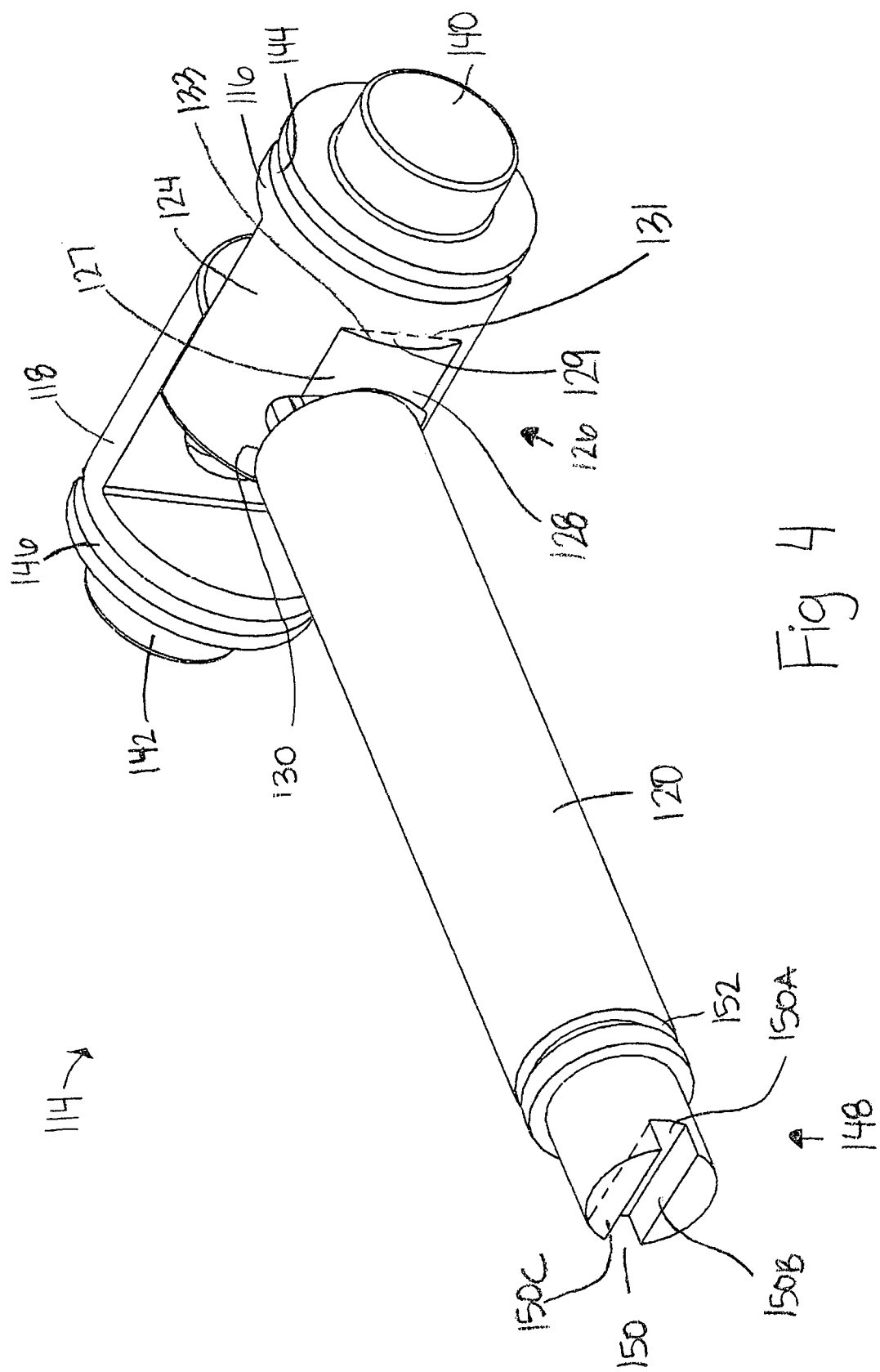
FIG. 4 is a right isometric view of the lock mechanism of FIG. 3.
Figure 5:
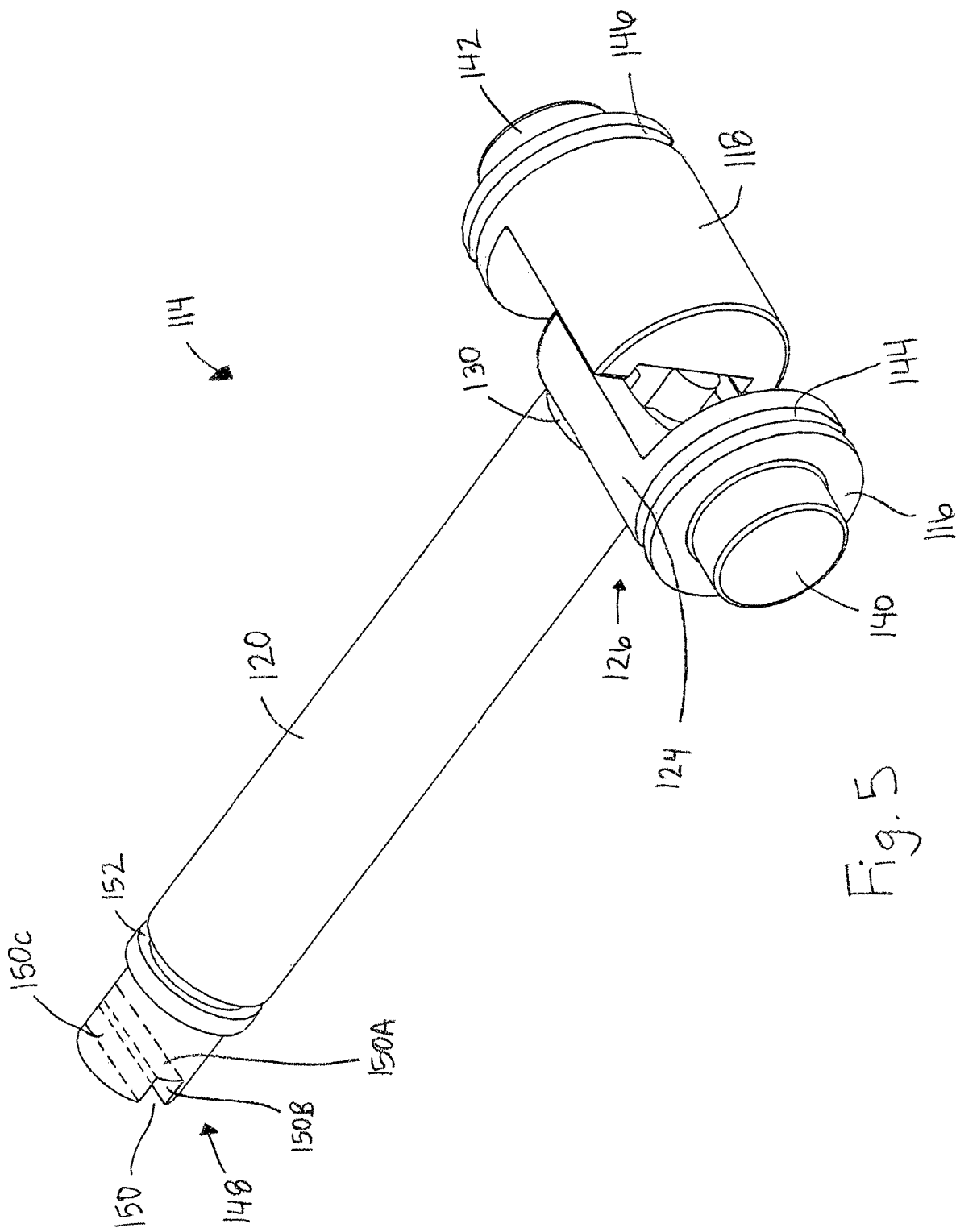
FIG. 5 is a right rear isometric view of the lock mechanism of FIG. 3.
Figure 6:
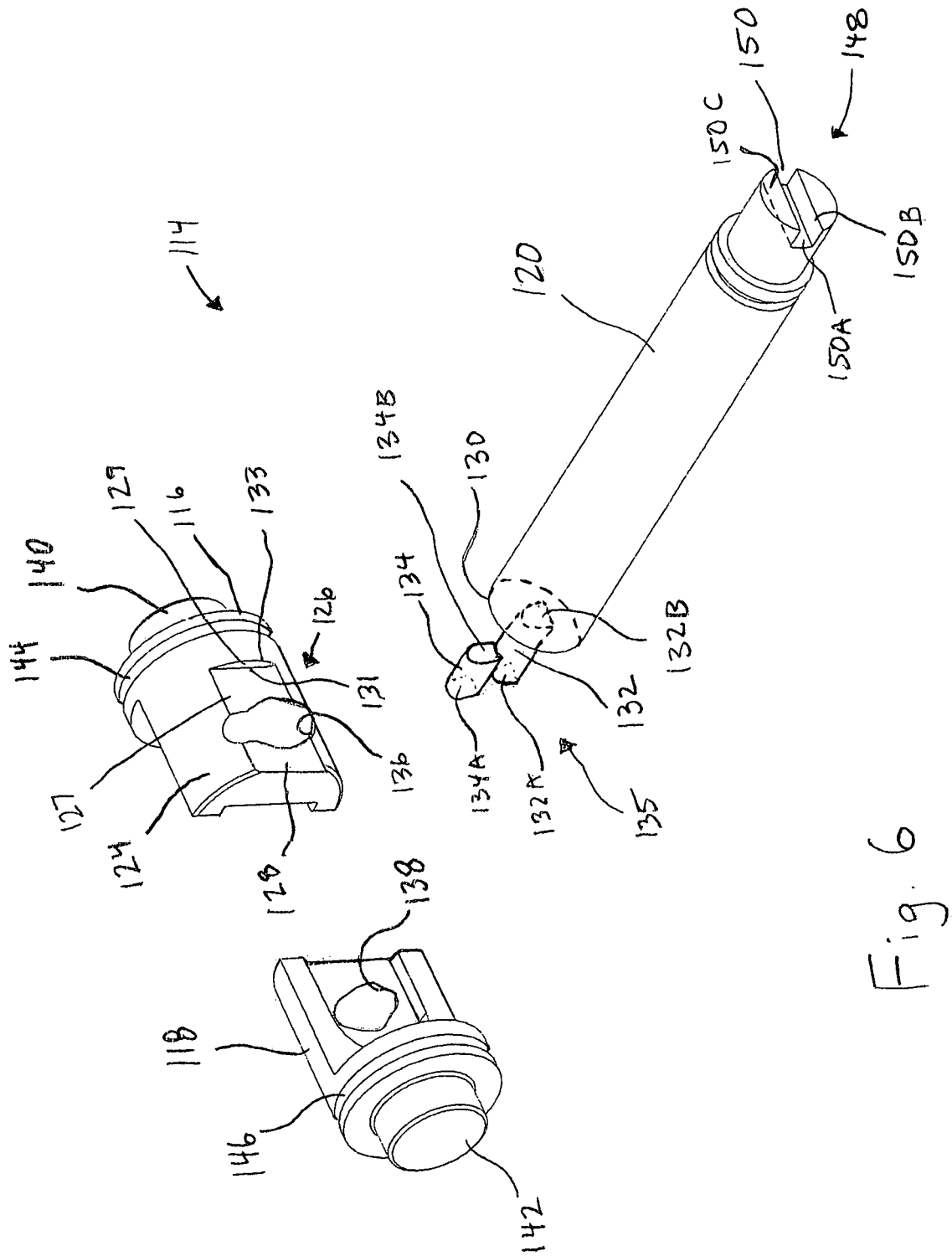
FIG. 6 is an exploded left isometric view of the lock mechanism of FIG. 2.

Referring now to FIGS. 1-2, a trailer hitch-mounted device, such as a trailer hitch ball mount 100 is disclosed. The trailer hitch ball mount 100 may include a shank 102 configured and adapted to be installed into a hitch receiver (not shown, See 250 of FIG. 7). A drop bar 104 may extend downwardly from the shank 102, and a ball support member 106 may be engaged with the drop bar 104. A hitch ball 108 may be disposed in the ball support member 106. The hitch ball 108 may be a double hitch ball, as shown, or may be a single hitch ball, in any configuration as is known in the art.

Trailer hitch ball mount 100 may also include a longitudinal bore 110 and a transverse bore 112. Longitudinal bore 110 may be disposed in shank 102, or may be disposed in both shank 102 and drop bar 104. For example, longitudinal bore 110 may have an opening at or near the top of the drop bar on a proximal surface of the drop bar, and may extend through the drop bar and into the shank. Longitudinal bore 110 may extend longitudinally at a downward angle, as shown in FIG. 2, or may otherwise extend parallel to the shank 102. Transverse bore 112 may be disposed in the shank 102. Transverse bore 112 may extend across the shank 102, with an opening on both the left and right exterior surfaces of the bore. Longitudinal bore 110 and transverse bore 112 may intersect in the shank 102.

According to the present disclosure, ball mount 100 may include a lock mechanism 114, which may be integral with or disposed in, on or together with ball mount 100. For example, lock mechanism 114 may include a first slide pin 116 and a second slide pin 118. First and second slide pins 116, 118 may be disposed in transverse bore 112. Lock mechanism 114 may also include a lock shaft 120 and a lock cylinder 122 disposed in longitudinal bore 110, and one or more keys 123. Lock cylinder 122 may be disposed in cooperation with a proximal end 148 of the lock shaft 120, including a mating portion 150, as described in more detail below. Lock shaft 120 may also have an o-ring groove 152.

Referring now to FIGS. 3-6, first slide pin 116 may have an outer surface 124 which may be cylindrical or arcuate. A contact portion 126 may be disposed on the outer surface 124, facing toward the lock shaft 120. Furthermore, contact portion 126 may be disposed proximal to or abutting the lock shaft 120. The contact portion 126 may include a flat surface 128.

Flat surface 128 may be a substantially flat surface. For example, flat surface 128 may include a discontinuous flat surface. Flat surface 128 may also include a surface that is flat but for one or more imperfections or non-uniformities. In an embodiment, a substantially flat surface may include a surface that is mostly planer, but is interrupted by a cavity, through-hole, protrusion, or other structure. The substantially flat surface may also include slight curvature or other non-uniformity, such as, for example, at the extremities of the surface. In another embodiment, flat surface 128 may be entirely flat, or may be a discontinuous surface that is otherwise entirely flat. For example, flat surface 128 may be interrupted by a cavity, through-hole, protrusion, or other structure, but is otherwise entirely flat.

In an embodiment, contact portion 126 may be a notch as shown in FIGS. 3-6, disposed on the portion of the exterior surface abutting the lock shaft. The contact portion 126 may also be linear, whereas the outer surface 124 is curved or arcuate. The contact portion 126 may be formed by two or more non-co-planer walls as shown in FIGS. 3-6, the two or more walls defining a recess having a concave corner, as explained in detail below. The recess may be any concavity, including concavities that are not surrounded on all sides.

In an embodiment, the lock shaft 120 may have a distal end 130. First slide pin 116 may be disposed proximal to the distal end 130 of the lock shaft 120. The flat surface 128 of the contact portion 126 may be parallel to the distal end 130 of the lock shaft 120. Further, the flat surface 128 of the contact portion 126 may abut the lock shaft 120, or the distal end 130 of the lock shaft 120. In another embodiment, the flat surface 128 may be disposed facing toward the distal end 130 of the lock shaft 120.

In an embodiment, contact portion 126 may define a recess having at least two walls that form an angle of less than 180 degrees. For example, a first wall 127 and a second wall 129 may form a concave corner 131. First and second wall 127, 129 may also form an angle that is less than 180 degrees, such as an acute, obtuse, or right angle. Second wall 129 may form a lip 133, which may be a convex corner, or otherwise may comprise the intersection between second wall 120 and outer surface 124 of first slide pin 116. Second wall 129 may define a partially-crescent sidewall, with lip 133 forming a partially-crescent or arcuate corner. Second wall 129 and lip 133 may be purely ornamental, and the configuration depicted and disclosed in detail herein may be a design choice from a variety of design options or alternatives. In an embodiment, first and second wall 127, 129 may be non-co-planer. Accordingly, the recess defining contact portion 126 may not be surrounded on all sides, being formed by only a first wall 127 and a second wall 129. Alternatively, the recess may include more than first wall 127 and second wall 129, and take the form of any concavity.

Lock shaft 120 may reside in the recess created by first and second walls 127, 129. For example, the distal end 130 of the lock shaft 120 may enter the space between first and second walls 127, 129. In another embodiment, the lock shaft 120, or the distal end 130 of the lock shaft 120, may reside in the space created by contact portion 126, whether it be a recess, a notch, a substantially flat surface, or otherwise.

As described in more detail below with reference to the function of the lock mechanism 114 of ball mount 100, when the lock mechanism 114 is in an unlocked position the lock shaft 120 may be disposed in closer proximity to second wall 129 than when the lock mechanism 114 is in a locked position. In other words, lock shaft 120 may be disposed near second wall 129, or near the concave corner 131 formed in the recess between first and second walls 127, 129 when first slide pin 116 is in the unlocked position. After first slide pin 116 is displaced transversely away from second slide pin 118 and lock shaft 120, or in other words when first slide pin 116 is in the locked position, lock shaft 120 may be disposed at a distance from second wall 129. Accordingly, lock shaft 120 may be disposed nearer or closer to the concave corner 131 or second wall 129 of the recess of the contact portion 126 of the first slide pin 116 when the first slide pin 116 is in the unlocked position than when the first slide pin 116 is in the locked position.

Lock shaft 120 may include a first cam surface 132 and a second cam surface 134. First slide pin 116 may include a first follower surface 136 and second slide pin 118 may include a second follower surface 138. The first cam surface 132 of the lock shaft 120 may be disposed in contact with the first follower surface 136 of the first slide pin 116. Similarly, the second cam surface 134 of the lock shaft 120 may be disposed in contact with the second follower surface 138 of the second slide pin 118. In other words, the lock shaft 120 and the first and second slide pins 116, 118 may cooperate by way of first and second cam surfaces 134, 136 and first and second follower surfaces 136, 138.

In an embodiment, first and second cam surfaces 132, 134 may abut distal end 130 of lock shaft 120. In yet another embodiment, first and second cam surfaces 132, 134 may be unitary with lock shaft 120, or alternatively may be a separate structure actuated by lock shaft 120. First and second cam surfaces 132, 134 may be connected such that they form a single structure with separate surfaces. For example, a cam portion 135 may comprise a first cam surface 132 and a second cam surface 134. Cam portion 135 may further comprise a first cam distal surface 132A, a first cam proximal surface 132B, a second cam distal surface 134A, and a second cam proximal surface 134B.

The lock shaft 120 may be configured and dimensioned to displace the first and second slide pins 116, 118 in a transverse direction opposite one another when the lock shaft 120 is rotated. For example, first cam surface 132 of lock shaft 120 may contact first follower surface 136 of first slide pin 116 such that when lock shaft 120 is rotated, first slide pin 116 is displaced in a transverse direction. Similarly, second cam surface 134 of lock shaft 120 may contact second follower surface 138 of second slide pin 118 such that when the lock shaft 120 is rotated, second slide pin 118 is displaced in a transverse direction. First and second slide pins 116, 118 may be displaced in a transverse direction opposite one another by the rotation of lock shaft 120, as further described below.

Contact portion 126 may prevent the binding of lock mechanism 114 by aligning first slide pin 116, and subsequently second slide pin 118, with lock shaft 120. Contact portion 126, including flat surface 128, first wall 127, the notch and/or the recess, may cooperate with lock shaft 120, or more specifically the distal end 130 of lock shaft 120, to prevent first slide pin 116 from rotating, such as would cause first and second slide pins 116, 118 to bind and no longer be capable of displacement.

Lock mechanism 114 may be operable between a locked position and an unlocked position. In other words, each of first and second slide pins 116, 118, lock shaft 120, and lock cylinder 122 may be operable between a locked position and an unlocked position. In the locked position, first and second slide pins 116, 118 may be disposed in an extended position, having been displaced in a transverse direction opposite one another. In the unlocked position, first and second slide pins 116, 118 may be disposed in a retracted position, having moved towards each other or towards the center.

Lock shaft 120 may be disposed in communication with lock cylinder (122 of FIGS. 1-2). For example, lock cylinder 120 may include a proximal end 148 that may include a mating portion 150, which may be any slot, protrusion, or other structure for mating the proximal end 148 to the lock cylinder. For example, mating portion 150 may be a slot defined by a set of walls 150A, 150B, and 150C. The set of walls may include a back wall 150A, an upper wall 150B, and a lower wall 150C. Lock cylinder 122 may provide the rotary motion, rotation, or turning that causes lock shaft 120 to produce the linear or transverse displacement of first and second slide pins 116, 118.

First and second slide pins 116, 118 may include first and second locking projections 140, 142, respectively, which are explained in more detail with reference to FIG. 7 below. First and second slide pins 116, 118 may also include first and second o-ring grooves 144, 146, respectively, which may receive an o-ring for the purpose of preventing dirt or other contaminating particles from entering the lock mechanism 114. Lock shaft 120 may similarly include an o-ring groove 152.

Figure 7:
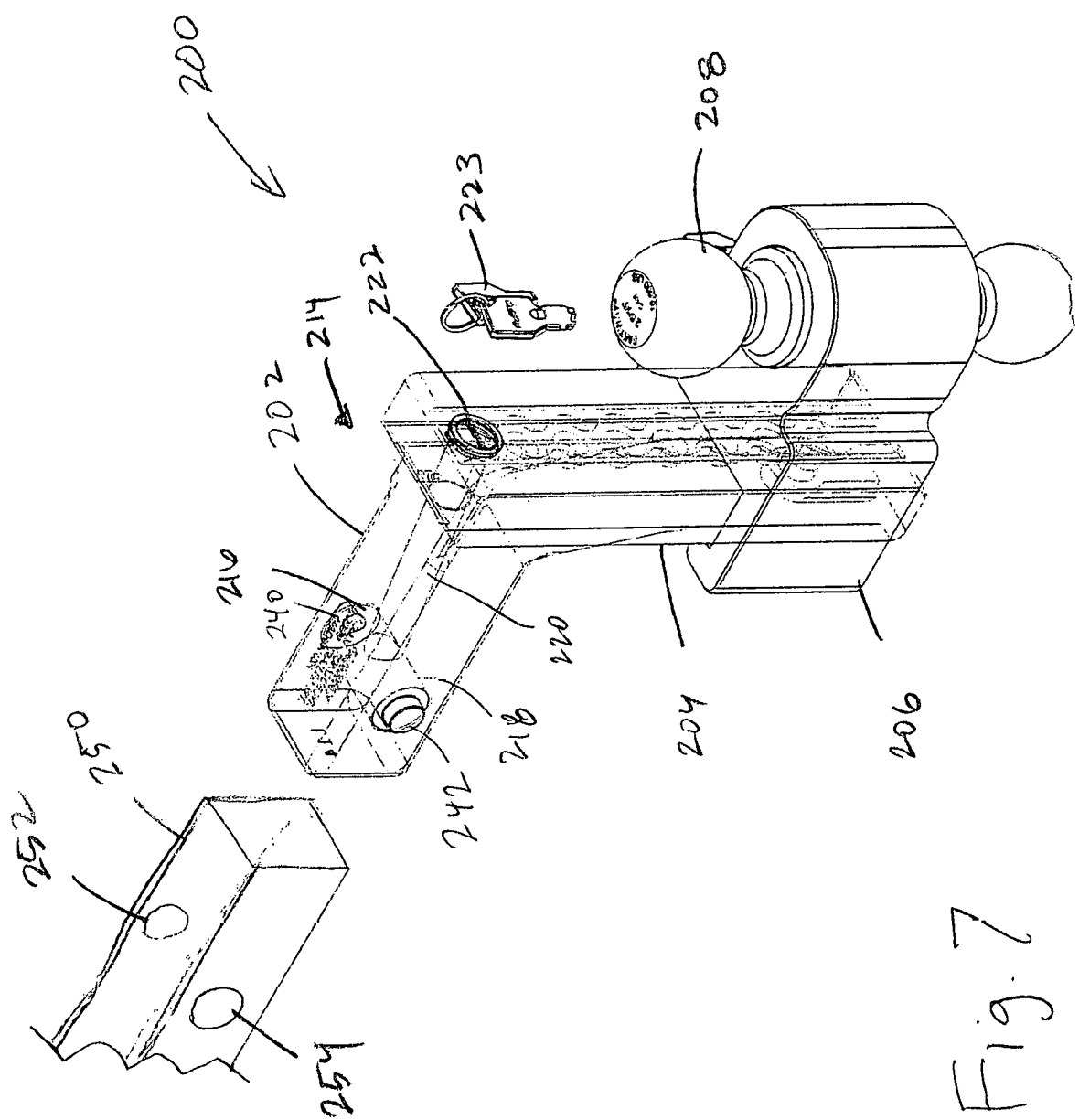
FIG. 7 is a detailed perspective view with hidden lines of an example of a trailer hitch ball mount according to the present disclosure.
Figure 8:
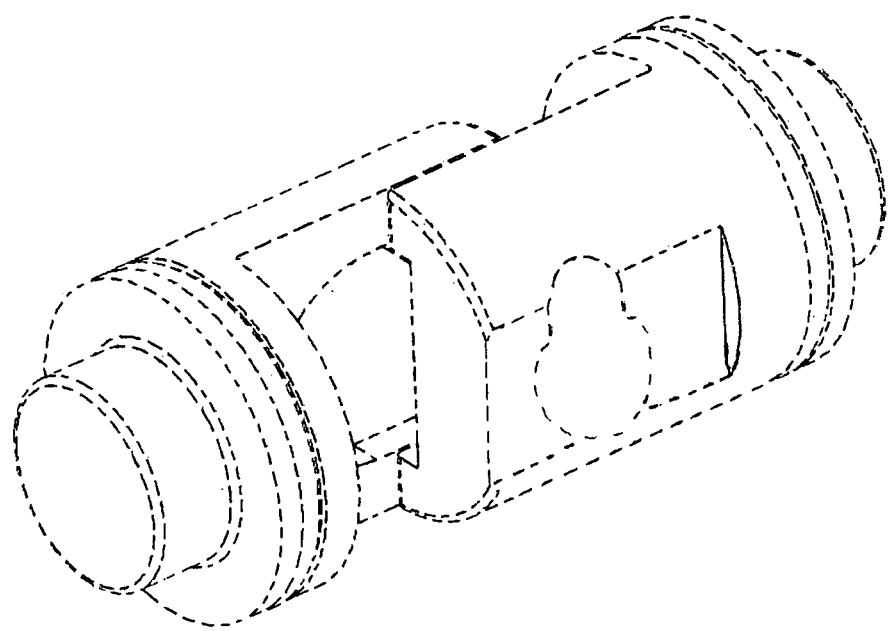
FIG. 8 is a further perspective view of the a lock mechanism of FIG. 2.
Figure 9:
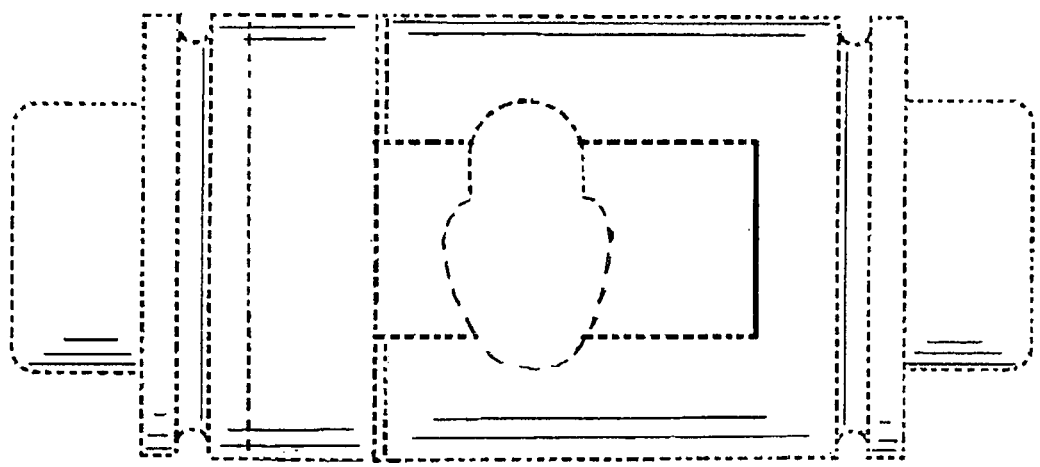
FIG. 9 is a front view of the lock mechanism of FIG. 8.
Figure 10:
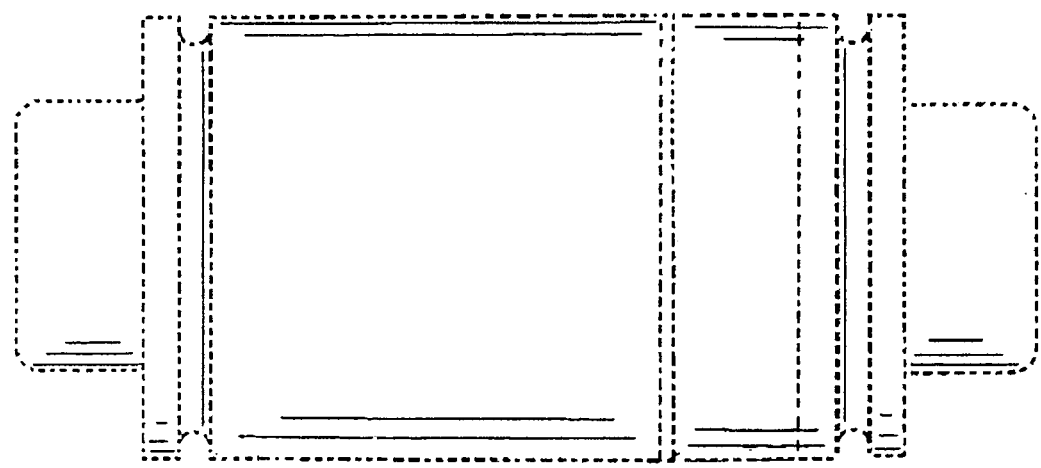
FIG. 10 is a back view of the lock mechanism of FIG. 8.
Figure 11:
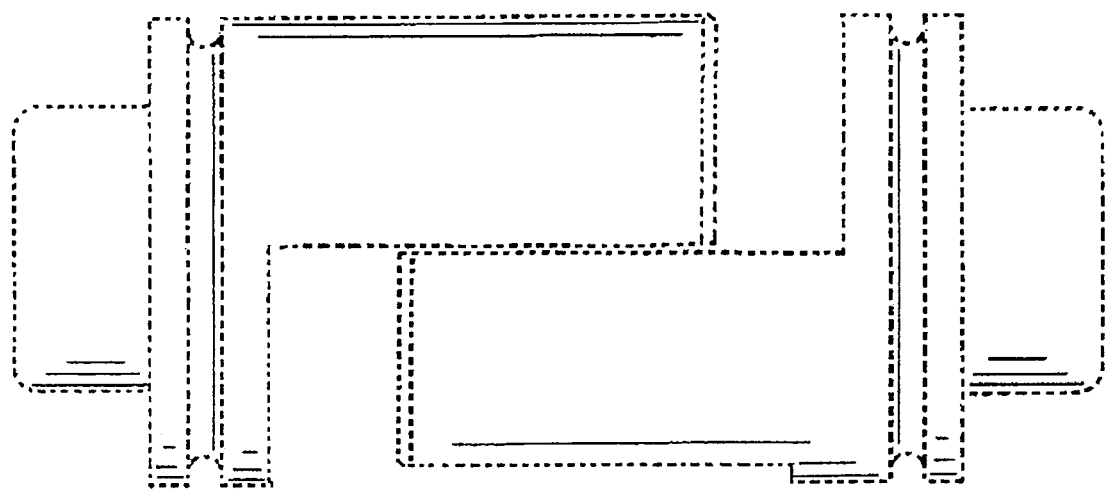
FIG. 11 is a top view of the lock mechanism of FIG. 8.
Figure 12:
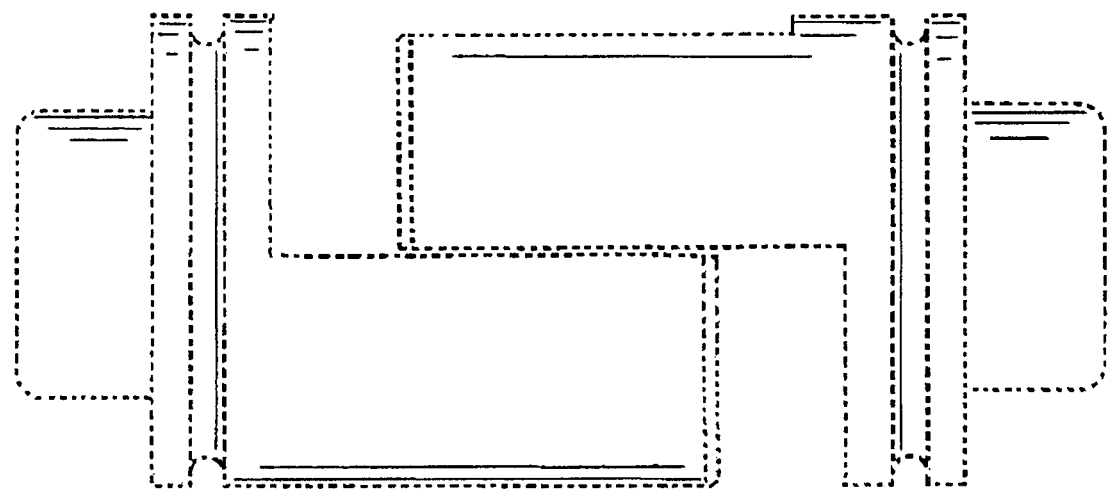
FIG. 12 is a bottom view of the lock mechanism of FIG. 8.
Figure 13:
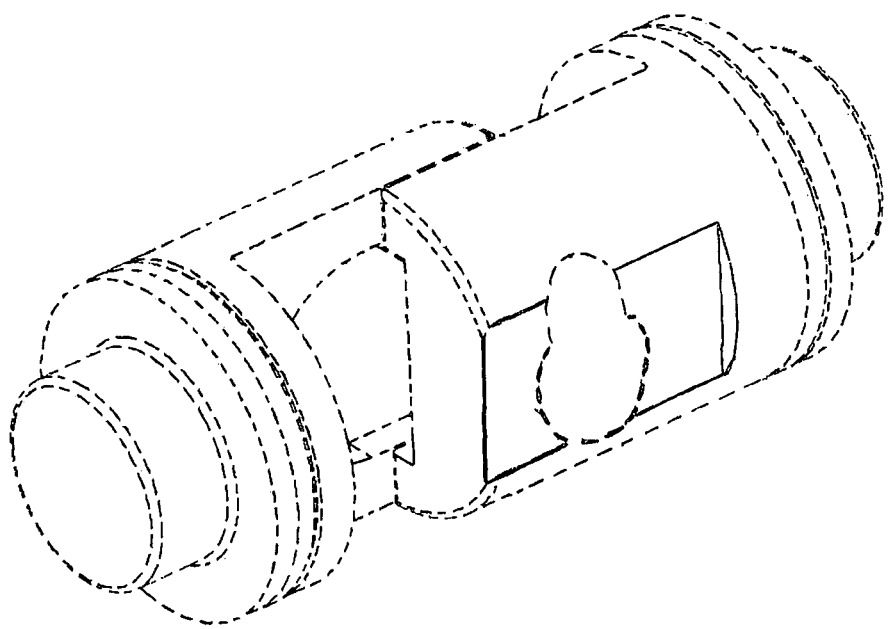
FIG. 13 is a further perspective view of the lock mechanism of FIG. 2.
Figure 14:
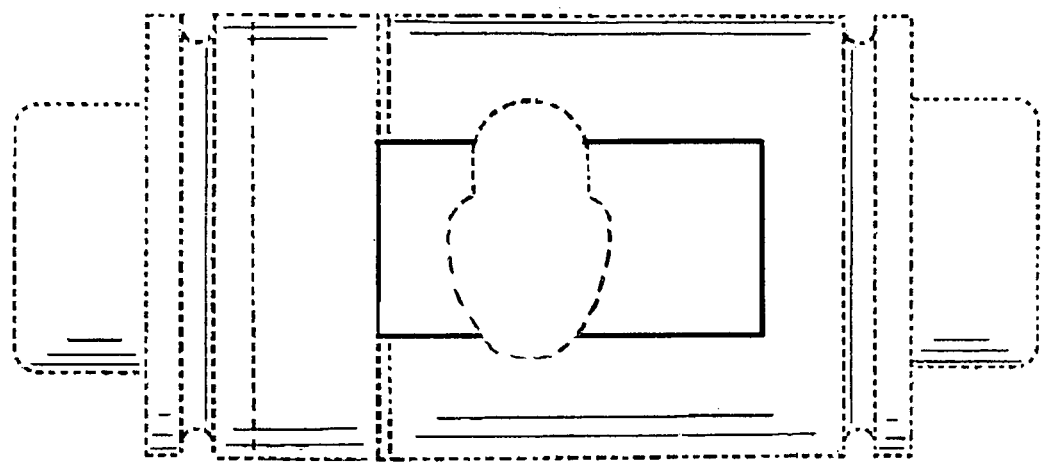
FIG. 14 is a front view of the lock mechanism of FIG. 13.
Figure 15:
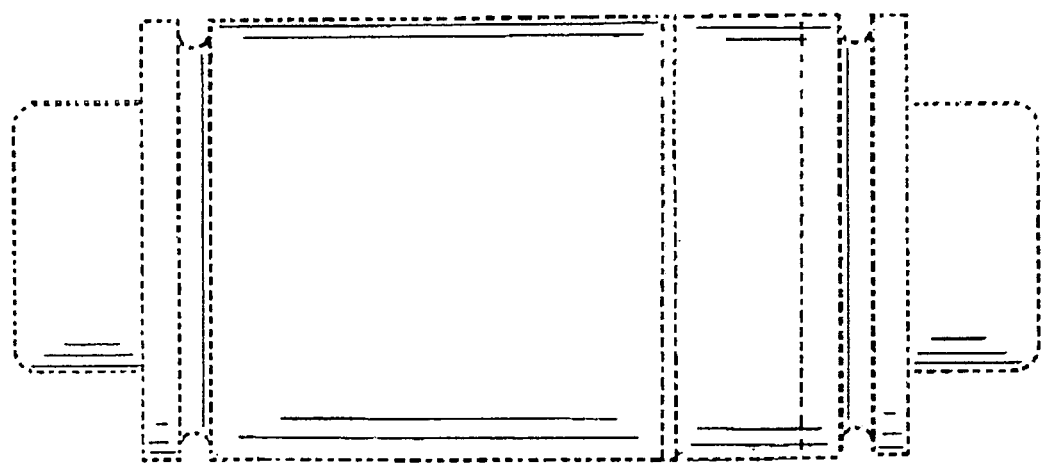
FIG. 15 is a back view of the lock mechanism of FIG. 13.
Figure 16:
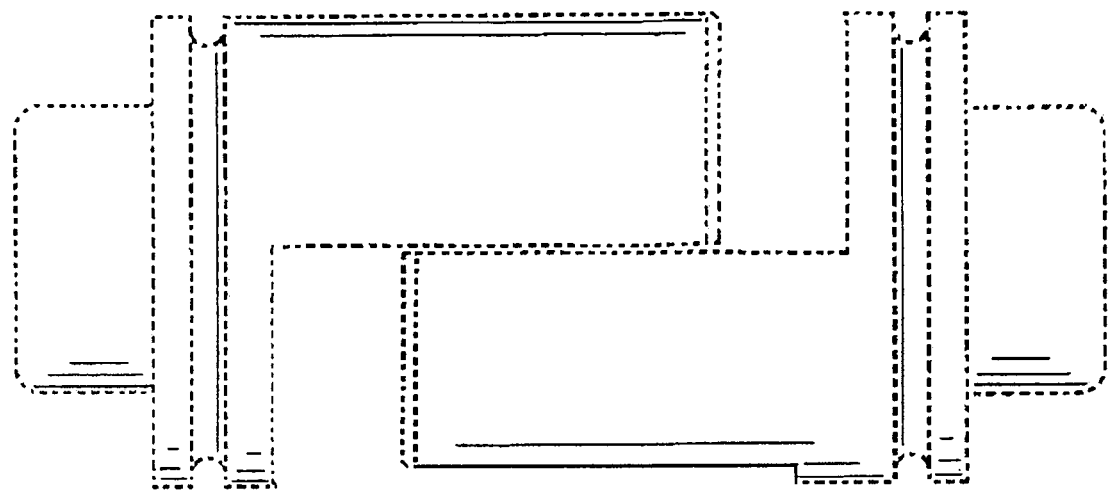
FIG. 16 is a top view of the lock mechanism of FIG. 13.
Figure 17:
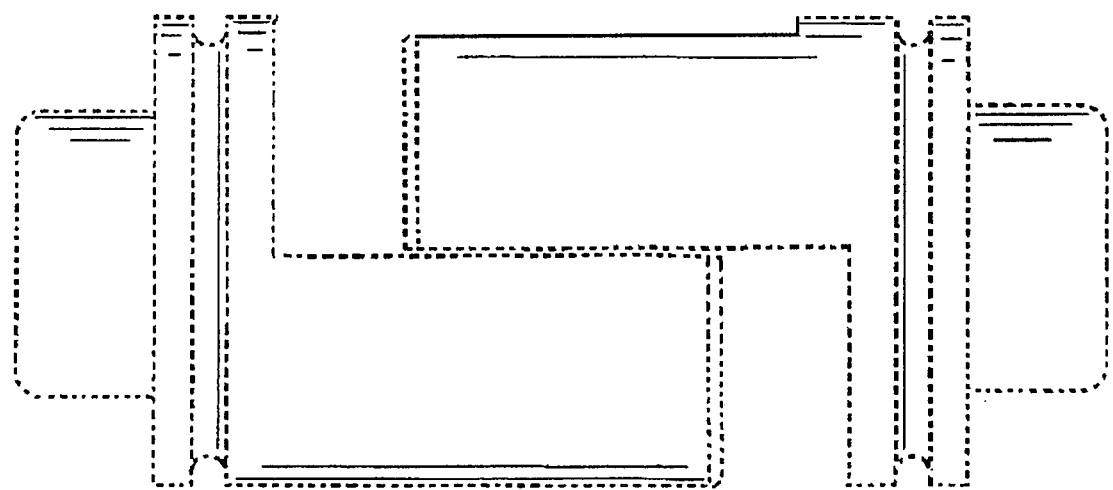
FIG. 17 is a bottom view of the lock mechanism of FIG. 13.
Figure 18:
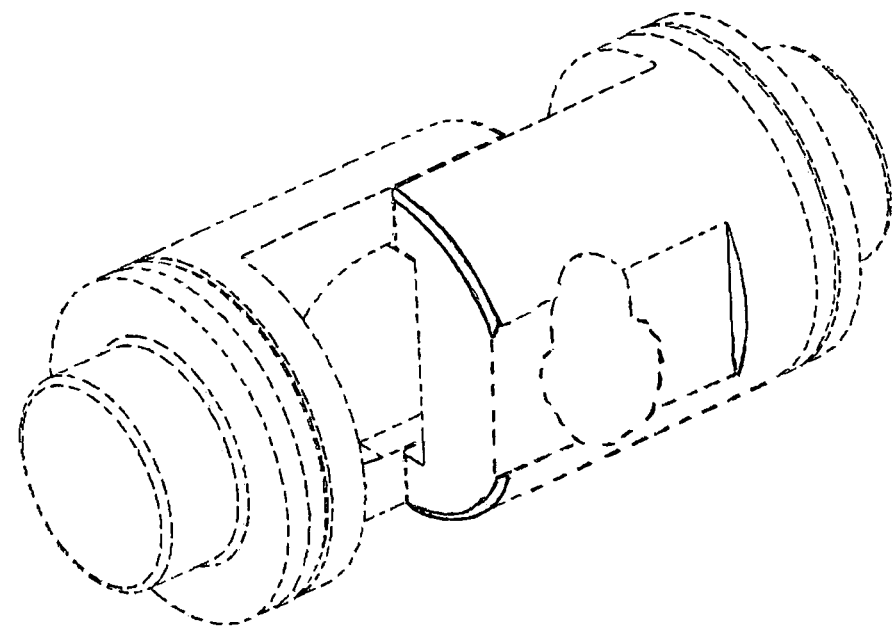
FIG. 18 is a further perspective view of the lock mechanism of FIG. 2.
Figure 19:
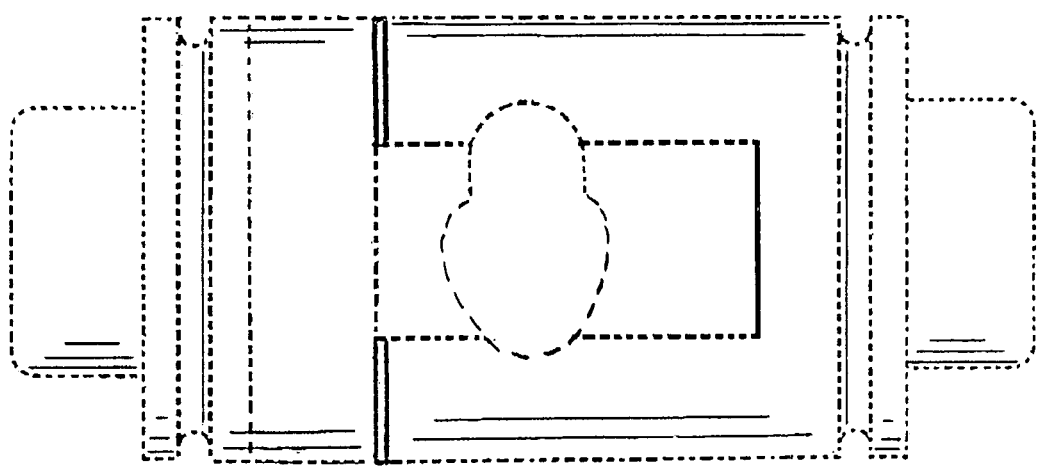
FIG. 19 is a front view of the lock mechanism of FIG. 18.
Figure 20:
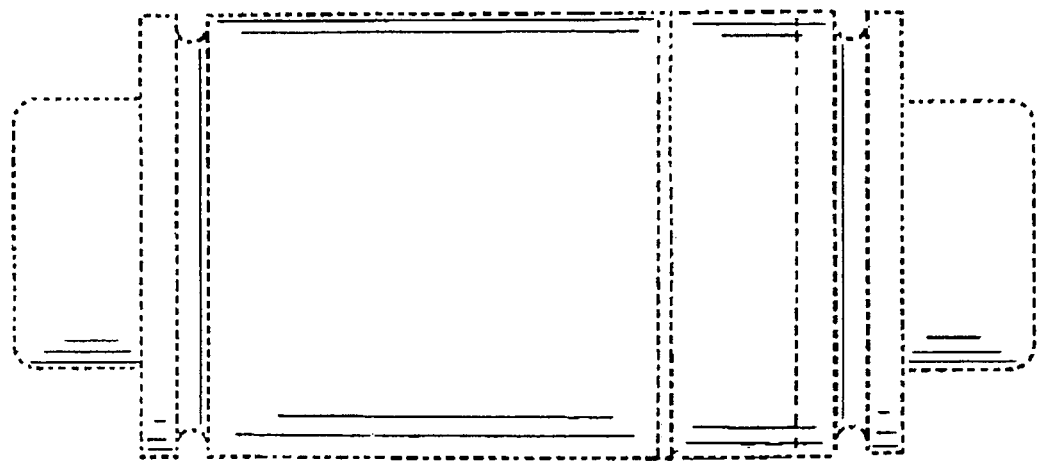
FIG. 20 is a back view of the lock mechanism of FIG. 18.
Figure 21:
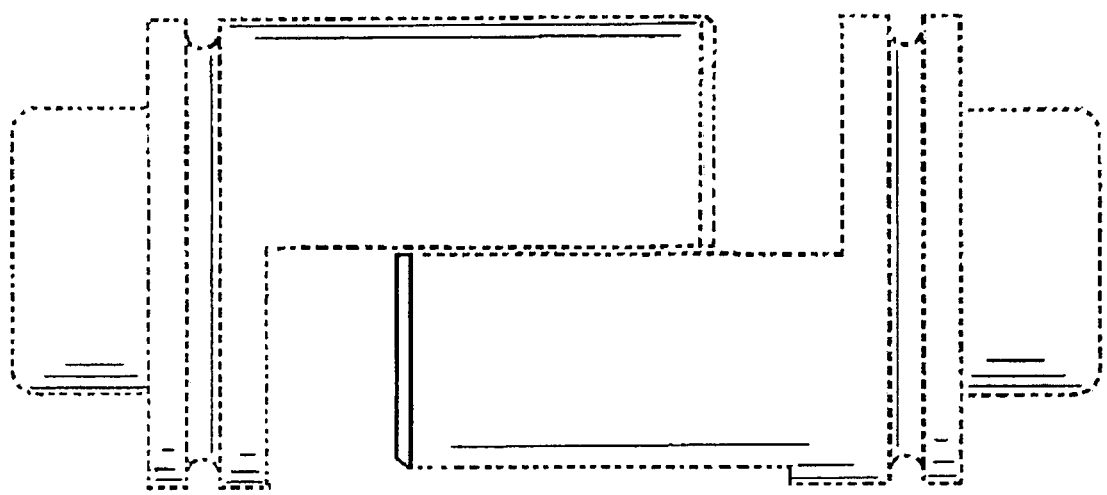
FIG. 21 is a top view of the lock mechanism of FIG. 18.
Figure 22:
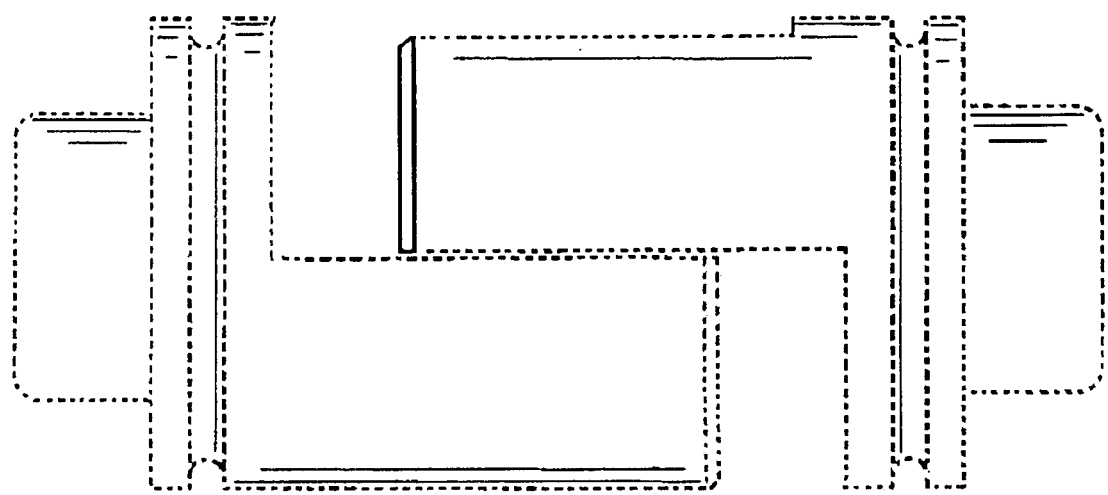
FIG. 22 is a bottom view of the lock mechanism of FIG. 18.

Referring now to FIG. 7, where like reference numerals represent like features, an embodiment of a trailer hitch ball mount 200 is shown. Ball mount 200 may include a shank 202 configured and adapted to be installed into a hitch receiver 250 of a tow vehicle. A drop bar 204 may extend downwardly from the shank 202, and a ball support member 206 may be engaged with the drop bar 204. A hitch ball 208 may be disposed in the ball support member 206.

Trailer hitch ball mount 200 may also include a lock mechanism 214, which may include a first slide pin 216, a second slide pin 218, a lock shaft 220, a lock cylinder 222, and one or more lock keys 223. Lock mechanism 214 may also include any or all of the features described above with reference to lock mechanism 114.

First and second slide pins 216, 218 may be configured and adapted to lock the ball mount 200, or the shank 202, in the hitch receiver 250. For example, First and second slide pins 216, 218 may include first and second lock projections 240, 242, respectively. First and second lock projections 240, 242 may be cylindrical, and may be a protrusion or other projecting structure configured, adapted, and dimensioned for making locking contact with hitch receiver 250.

Hitch receiver 250 may include a first lock aperture 252 and a second lock aperture 254. First and second lock apertures 252, 254 may be configured and dimensioned to receive the first and second slide pins 216, 218, respectively. In other words, first and second lock projections 240, 242 may be configured, adapted, and dimensioned to engage one of first and second lock apertures 252, 254 of hitch receiver 250. For example, the transverse displacement of first and second slide pins 216, 218 may cause first and second lock projections 240, 242 to engage first and second lock apertures 252, 254, thereby securing the shank 202 of ball mount 200 in the hitch receiver 250.

Lock mechanism 214 may be operable between a locked position and an unlocked position, as described with reference to lock mechanism 114 above. In the locked position, first lock projection 240 may be disposed within, engaged by, or in contact with first lock aperture 252. Similarly, second lock projection 242 may be disposed within, engaged by, or in contact with second lock aperture 254 in the locked position. By contrast, in the unlocked position, first and second lock projections 240, 242 may be free of, clear of or disengaged with lock apertures 252, 254.

In the unlocked position, first and second slide pins 216, 218 may be in a retracted position such that first and second lock projections 240, 242 are flush with shank 250. For example, first and second lock projections 240, 242 may reside completely within the transverse bore (see 112 of FIG. 1) of the ball mount 200, with no portion of the lock protections 240, 242 extending beyond any of the outside walls of the shank 202. In such a position, ball mount 200, or more precisely the shank 202 of ball mount 200, may be inserted into receiver 250 without obstruction. In an embodiment, projections 240, 242 may be disposed with an outermost surface parallel to the outside walls of the shank 202 to facilitate installation of the ball mount 200 into the receiver 250, or may be disposed in any other relation to the shank 202 so as to provide clearance when entering the receiver 250.

Furthermore, a method of locking a trailer hitch ball mount to a trailer hitch receiver of a tow vehicle may be made apparent by the present disclosure. The method may include providing a lock mechanism disposed in at least a shank of a trailer hitch ball mount. The lock mechanism provided may include at least a first slide pin. The first slide pin may have a cylindrical exterior surface and a contact portion disposed on the exterior surface. The lock mechanism may also include a lock shaft. The lock shaft may have a distal end, and the distal end of the lock shaft may abut the contact portion of the exterior surface of the first slide pin. The contact portion of the first slide pin may include a flat surface. The method may further include actuating the lock mechanism to cause the first slide pin to engage a lock aperture formed in a hitch receiver. The step of actuating the lock mechanism may further include the step of actuating the lock mechanism to cause the flat surface of the first slide pin to contactably slide in contact with and relative to the lock shaft.

In addition, the method of locking a trailer hitch ball mount to a trailer hitch receiver of a tow vehicle may include inserting a key into the lock cylinder and turning the key to cause the lock shaft to rotate, thereby causing the first slide pin to be displaced laterally.

The method of locking a trailer hitch ball mount to a trailer hitch receiver may further include a lock mechanism having a second slide pin. The contact portion may define a recess, which may include at least two walls and a concave corner, as described above in more detail. The method may further include a lock mechanism that is operable between a locked position and an unlocked position, or first slide pin, second slide pin, lock shaft, and lock cylinder that are operable between a locked position and an unlocked position. The lock shaft may be disposed closer to the concave corner in the unlocked position than in the locked position. In addition, the method may include the step of actuating the lock mechanism to move the first and second slide pins to the locked position. The method may include a variety of other steps and functions that will be made apparent by the present disclosure.

Referring now to FIGS. 8-22, various embodiments of a new design of a lock mechanism, or slide pins for a lock mechanism, which may be a lock mechanism integral with a trailer hitch ball mount, are shown. FIGS. 8-12 depict a first embodiment of a lock mechanism. FIGS. 13-17 depict a second embodiment of a lock mechanism. The second embodiment of the lock mechanism may differ from the first embodiment by depicting more of the lock mechanism in solid lines than in the first embodiment. Specifically, the second embodiment of the lock mechanism may show a contact portion, notch, recess, or flat surface in solid lines. FIGS. 18-22 depict a third embodiment of a lock mechanism. The third embodiment of the lock mechanism may differ from the first and second embodiments by depicting more of the lock mechanism in solid lines than in the first and second embodiments. Specifically, the third embodiment of the lock mechanism may show a pair of slide pins in solid lines.

Those having ordinary skill in the relevant art will appreciate that a variety of hitch-mounted devices or apparatus may utilize an integral lock mechanism as disclosed herein. In addition to the trailer hitch ball mount disclosed herein, the present disclosure relates to hitch-mounted covers, lights, steps, cargo carriers, bicycle carriers, tire mounts, tool boxes, or any other of the number of hitch-mounted devices. Accordingly, the integral lock mechanism disclosed herein may be incorporated into any hitch-mounted device, including those listed above.

Those having ordinary skill in the relevant art will also appreciate the advantages provide by the features of the present disclosure. For example, it is a feature of the present disclosure to provide a trailer hitch system with a integral lock mechanism to conveniently provide for locking securement of a hitch-mounted device to a trailer hitch receiver of a tow vehicle. It is another feature of the present disclosure to provide a hitch-mounted apparatus, such as a trailer hitch ball mount, with an integral lock mechanism that prevents binding of the lock mechanism to provide reliable locking functionality. More specifically, it is a feature of the present disclosure to provide a slide pin having a contact portion, flat surface, notch or recess that cooperates with a lock shaft to prevent the slide pin from rotating or otherwise moving to a position that would inhibit the cooperation of the lock shaft and the slide pin.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed:

1. A trailer hitch-mounted apparatus comprising:
   a shank comprising a longitudinal bore and a transverse bore;
   a lock shaft disposed in the longitudinal bore;
   a first slide pin disposed in the transverse bore, the first slide pin comprising a contact portion facing toward the lock shaft; and
   a second slide pin disposed in the transverse bore;
   wherein the contact portion of the first slide pin comprises a substantially flat surface and the substantially flat surface abuts the lock shaft;
   wherein the lock shaft comprises a distal end, and the flat surface abuts the distal end of the lock shaft.

2. The apparatus of claim 1 wherein the first slide pin comprises a cylindrical outer surface, the contact portion is disposed on the outer surface of the first slide pin, and the contact portion is linear.

3. The apparatus of claim 1 wherein the lock shaft comprises a distal end, and the flat surface of the contact portion of the first slide pin is disposed parallel to the distal end of the lock shaft.

4. The apparatus of claim 1 wherein the lock shaft comprises a first cam surface and a second cam surface.

5. The apparatus of claim 4 wherein the first cam surface of the lock shaft is disposed in contact with a first follower surface formed on the first slide pin, and the second cam surface of the lock shaft is disposed in contact with a second follower surface formed on the second slide pin.

6. The apparatus of claim 5 wherein the lock shaft is configured and dimensioned to displace the first and second slide pins in a transverse direction opposite one another when the lock shaft is rotated.

7. The apparatus of claim 1 further comprising a lock cylinder disposed in the longitudinal bore, the lock cylinder disposed in cooperation with a proximal end of the lock shaft.

8. The apparatus of claim 1 wherein the first slide pin and the second slide pin are configured and dimensioned to be displaced in a transverse direction opposite one another.

9. The apparatus of claim 1 wherein the contact portion comprises a recess.

10. The apparatus of claim 9, wherein the recess comprises at least two walls and a concave corner.

11. The apparatus of claim 10, wherein the first slide pin is operable between a locked position and an unlocked position, and wherein the lock shaft is disposed closer to the concave corner of the recess of the contact portion of the first slide pin when the first slide pin is in the unlocked position than when in the locked position.

12. A trailer hitch system comprising:
    a shank configured and adapted to be installed into a hitch receiver;
    a drop bar extending downwardly from the shank;
    a ball support member engaged with the drop bar;
    a hitch ball disposed in the ball support member; and
    a lock mechanism comprising a first slide pin, a second slide pin, and a lock shaft abutting a portion of an exterior surface of the first slide pin;
    wherein the first and second slide pins are configured and adapted to lock the shank in the hitch receiver, and the first slide pin comprises a notch on the portion of the exterior surface abutting the lock shaft, and
    wherein the lock shaft comprises a distal end, and the notch comprises a flat surface that is parallel to the distal end of the lock shaft.

13. The system of claim 12 wherein the notch comprises a flat surface.

14. The system of claim 12 wherein the exterior surface of the first slide pin is cylindrical, and the notch is linear.

15. The system of claim 12 wherein the hitch receiver comprises a first lock aperture configured and dimensioned to receive the first slide pin and a second lock aperture configured and dimensioned to receive the second slide pin.

16. The system of claim 15 wherein the first and second slide pins each comprise a cylindrical protrusion configured and dimensioned to engage one of the first and second lock apertures of the hitch receiver.

17. The system of claim 12 wherein the lock shaft comprises a first cam surface disposed in contact with a first follower surface formed on the first slide pin.

18. The system of claim 17 wherein the first cam surface and the first follower surface are configured and adapted to produce transverse displacement of the first slide pin when the lock shaft is rotated.

19. The system of claim 12 wherein the notch of the first slide pin defines a recess comprising at least two walls and a concave corner.

20. A method of locking a trailer hitch-mounted apparatus to a trailer hitch receiver comprising:
    providing a lock mechanism disposed in at least a shank of a trailer hitch ball mount, the lock mechanism comprising:
      a first slide pin comprising a cylindrical exterior surface and a contact portion disposed on the exterior surface; and
      a lock shaft abutting the contact portion of the exterior surface of the first slide pin;
      wherein the contact portion of the first slide pin comprises a flat surface;
    actuating the lock mechanism to cause the first slide pin to engage a lock aperture formed in a hitch receiver;
    inserting a key into a lock cylinder; and
    turning the key to cause the lock shaft to rotate, thereby causing the first slide pin to be displaced laterally.

21. The method of claim 20, wherein the step of actuating the lock mechanism further comprises the step of:
    actuating the lock mechanism to cause the flat surface of the first slide pin to contactably slide in contact with and relative to the lock shaft.

22. The method of claim 20, wherein the contact portion comprises a recess.

23. The method of claim 22, wherein the recess comprises at least two walls and a concave corner.

24. The method of claim 23, wherein the first slide pin is operable between a locked position and an unlocked position, and wherein the lock shaft is disposed closer to the concave corner in the unlocked position than in the locked position.

25. The method of claim 20, wherein the lock mechanism further comprises a second slide pin.

26. The method of claim 25, wherein the step of actuating the lock mechanism further comprises the step of:
  actuating the lock mechanism to move the first and second slide pins to a locked position.

27. A trailer hitch system comprising:
  a shank configured and adapted to be installed into a hitch receiver;
  a drop bar extending downwardly from the shank;
  a ball support member engaged with the drop bar;
  a hitch ball disposed in the ball support member; and
  a lock mechanism comprising a first slide pin, a second slide pin, and a lock shaft abutting a portion of an exterior surface of the first slide pin;
  wherein the first and second slide pins are configured and adapted to lock the shank in the hitch receiver, and the first slide pin comprises a notch on the portion of the exterior surface abutting the lock shaft; and
  wherein the lock shaft comprises a first cam surface disposed in contact with a first follower surface formed on the first slide pin and the first cam surface and the first follower surface are configured and adapted to produce transverse displacement of the first slide pin when the lock shaft is rotated.

28. A trailer hitch system comprising:
  a shank configured and adapted to be installed into a hitch receiver;
  a drop bar extending downwardly from the shank;
  a ball support member engaged with the drop bar;
  a hitch ball disposed in the ball support member; and
  a lock mechanism comprising a first slide pin, a second slide pin, and a lock shaft abutting a portion of an exterior surface of the first slide pin;
  wherein the first and second slide pins are configured and adapted to lock the shank in the hitch receiver, and the first slide pin comprises a notch on the portion of the exterior surface abutting the lock shaft; and
  wherein the notch of the first slide pin defines a recess comprising at least two walls and a concave corner.

29. A method of locking a trailer hitch-mounted apparatus to a trailer hitch receiver comprising:
  providing a lock mechanism disposed in at least a shank of a trailer hitch ball mount, the lock mechanism comprising:
    a first slide pin comprising a cylindrical exterior surface and a contact portion disposed on the exterior surface; and
    a lock shaft abutting the contact portion of the exterior surface of the first slide pin;
    wherein the contact portion of the first slide pin comprises a flat surface;
  actuating the lock mechanism to cause the first slide pin to engage a lock aperture formed in a hitch receiver;
    wherein the recess comprises at least two walls and a concave corner;
  wherein the contact portion comprises a recess; and
  wherein the recess comprises at least two walls and a concave corner.

* * * * *